United States Patent
Isobe

(10) Patent No.: US 9,560,340 B2
(45) Date of Patent: Jan. 31, 2017

(54) THREE-DIMENSIONAL IMAGE PICKUP LENS SYSTEM AND IMAGE PICKUP SYSTEM INCLUDING THE SAME

(71) Applicant: CANON KABUSHIKI KAISHA, Tokyo (JP)

(72) Inventor: Shingo Isobe, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 404 days.

(21) Appl. No.: 14/087,522

(22) Filed: Nov. 22, 2013

(65) Prior Publication Data

US 2014/0146141 A1 May 29, 2014

(30) Foreign Application Priority Data

Nov. 27, 2012 (JP) ................. 2012-258578

(51) Int. Cl.
*H04N 13/02* (2006.01)
*H04N 5/232* (2006.01)
(Continued)

(52) U.S. Cl.
CPC ............ *H04N 13/0296* (2013.01); *G03B 5/00* (2013.01); *G03B 35/08* (2013.01);
(Continued)

(58) Field of Classification Search
CPC ................ G03B 2205/0015; G03B 2217/005; G03B 35/08; G03B 5/00; H04N 13/0296; H04N 5/23258; H04N 5/23287
See application file for complete search history.

(56) References Cited

U.S. PATENT DOCUMENTS 5,978,015 A * 11/1999 Ishibashi ................ G03B 35/08
348/47
2008/0117303 A1* 5/2008 Furumochi ............. G01V 1/008
348/208.2
(Continued)

FOREIGN PATENT DOCUMENTS

JP 2010103895 A 5/2010
JP 2011017929 A 1/2011

*Primary Examiner* — Christopher S Kelley
*Assistant Examiner* — Deirdre Beasley
(74) *Attorney, Agent, or Firm* — Rossi, Kimms & McDowell LLP

(57) ABSTRACT

A three-dimensional image pickup lens system, including two lens apparatuses, each of the two lens apparatuses including: an optical element drivers in a direction containing a component perpendicular to an optical axis; a driving unit driving the optical element; a detector detecting vibration of a corresponding one of the lens apparatuses; a first generator generating a first signal driving the optical element to correct image blur due to the vibration; a second generator generating a second signal driving the optical element to a position corresponding to a set angle of convergence; a retainer retaining an effective maximum correction amount as a correctable maximum image stabilization amount determined based on the second signals generated in the lens apparatuses and is common to the lens apparatuses; and a controller driving the optical element by the driving unit based on the first signal, the second signal, and the effective maximum correction amount.

13 Claims, 6 Drawing Sheets

(51) Int. Cl.
*G03B 5/00* (2006.01)
*G03B 35/08* (2006.01)
(52) U.S. Cl.
CPC ..... *H04N 5/23258* (2013.01); *H04N 5/23287* (2013.01); *G03B 2205/0015* (2013.01); *G03B 2217/005* (2013.01)

(56) References Cited

U.S. PATENT DOCUMENTS

| | | | | |
|---|---|---|---|---|
| 2011/0007133 | A1* | 1/2011 | Imanishi | G03B 17/00 348/42 |
| 2011/0085788 | A1* | 4/2011 | Pace | G03B 35/08 396/325 |
| 2011/0169918 | A1* | 7/2011 | Yoo | H04N 13/0296 348/46 |
| 2011/0279654 | A1* | 11/2011 | Ueda | G03B 17/14 348/49 |
| 2011/0299163 | A1* | 12/2011 | Matsuura | H04N 5/23248 359/557 |
| 2012/0062707 | A1* | 3/2012 | Seo | H04N 13/0239 348/47 |
| 2012/0327197 | A1* | 12/2012 | Yamashita | G03B 35/08 348/50 |
| 2013/0088580 | A1* | 4/2013 | Ikeda | G02B 7/102 348/49 |
| 2013/0128007 | A1* | 5/2013 | Suzui | H04N 13/0203 348/49 |
| 2013/0170029 | A1* | 7/2013 | Morita | G02B 27/22 359/464 |

* cited by examiner

THREE-DIMENSIONAL IMAGE PICKUP LENS SYSTEM AND IMAGE PICKUP SYSTEM INCLUDING THE SAME

BACKGROUND OF THE INVENTION

Field of the Invention

The present invention relates to a three-dimensional image pickup lens system, and more particularly, to a three-dimensional image pickup lens system configured to control an optical axis by using an image stabilization unit, and an image pickup system including the three-dimensional image pickup lens system.

Description of the Related Art

Hitherto, there is known an image pickup system for three-dimensional imaging by using multiple image pickup apparatuses, each of which can foe used as a standalone lens apparatus. A pair of image pickup apparatuses used for three-dimensional imaging is configured to be driven simultaneously so that optical conditions are always identical, which vary in accordance with a state or a position of a control target such as zoom, focus, and stop. In addition, a three-dimensional effect is adjusted by adjusting a convergence length at which the optical axes of the respective image pickup apparatuses cross in shooting, and a base length as a distance between the image pickup apparatuses. Images taken by the three-dimensional imaging in this way are each combined as an image for a left eye and an image for a right eye.

As a method for controlling an angle of convergence, there are proposed a method of rotating the entire image pickup apparatus so as to change an optical axis direction for changing the angle of convergence, and a method of displacing an optical element such as a mirror or a prism for bending a light beam so as to change the optical axis direction for changing the angle of convergence. However, in either method, a structure of the image pickup apparatus becomes large. In addition, because the image pickup apparatus becomes a dedicated one for the three-dimensional imaging, it has no versatility and has poor usability.

In order to solve this problem, for example, Japanese Patent Application Laid-Open No. 2010-103895 discloses a method of controlling the angle of convergence by using an optical element (hereinafter referred to as a shift lens) mounted for image stabilization that moves in a plane perpendicular to the optical axis. In addition, there is disclosed a method of adjusting the angle of convergence and correcting image blur by adding a movement amount of the shift lens for controlling the angle of convergence to a movement amount of the shift lens for image stabilization for driving.

In addition, in an imaging method called panning photography, the above-mentioned movement amount of the shift lens for image stabilization is integrated when a panning operation is performed. When it is detected that an integrated value has exceeded a maximum correction angle, panning determination is performed for determining that not a fluctuation to be subjected to the image stabilization has occurred but the panning operation has been performed, and the shift lens is returned to a predetermined position. However, in a state where the convergence length is set in three-dimensional imaging, because the maximum correction angle is different between the right and left lenses, a parallax displacement is generated between the right and left lenses.

In order to solve this problem, for example, Japanese Patent Application Laid-Open No. 2011-017929 discloses a method of returning a mechanism for image stabilization to an optical axis center ox each lens when the panning operation, is detected, which enables to prevent the above-mentioned parallax displacement.

However, in the above-mentioned conventional technologies disclosed in Japanese Patent Application Laid-Open No. 2010-103895 and Japanese Patent Application Laid-Open No. 2011-017929, because the image stabilization mechanism is returned to the optical axis center regardless of the set convergence length, a parallax amount is different between during normal photography and during panning photography.

For instance, if the panning operation is performed while a subject is being photographed with a certain parallax amount, the convergence length is returned to the optical axis center only during the panning operation, and hence the three-dimensional effect is different. In this case, an unnatural image is taken during the panning operation. In particular, the image is unusable in photographing a moving image.

SUMMARY OF THE INVENTION

Therefore, the present invention provides a three-dimensional image pickup lens system configured to effectively achieve both optical axis control for changing the convergence length to a desired point and panning control for limiting image stabilization control if panning operation is performed when the image stabilization is effective.

In order to achieve the above-mentioned object, a three-dimensional image pickup lens system according to one embodiment of the present invention includes two lens apparatuses, each of the two lens apparatuses including: an optical element to be driven in a direction containing a component in a direction perpendicular to an optical axis; a driving unit driving the optical element; a detector detecting vibration of a corresponding one of the two lens apparatuses; a first generator generating a first signal driving the optical element so as to correct image blur due to the vibration; a second generator generating a second signal driving the optical element to a position corresponding to a set angle of convergence; a retainer retaining an effective maximum correction amount as a correctable maximum image stabilization amount that is determined based on the second signals generated in the two lens apparatuses and is common to the two lens apparatuses; and a controller controlling the driving unit to drive the optical element based on the first signal, the second signal, and the effective maximum correction amount.

According to one embodiment of the present invention, it is possible to provide the three-dimensional image pickup lens system configured to effectively achieve both optical axis control for changing the convergence length (changing the angle of convergence) and panning control in image stabilization.

Further features of the present invention will become apparent from the following description of exemplary embodiments with reference to the attached drawings.

DESCRIPTION OF THE EMBODIMENTS

Now, embodiments of the present invention are described in detail with reference to the attached drawings.

First Embodiment

A three-dimensional image pickup lens system according to a first embodiment of the present invention is described below with reference to FIGS. 1 to 4.

Figure 1:
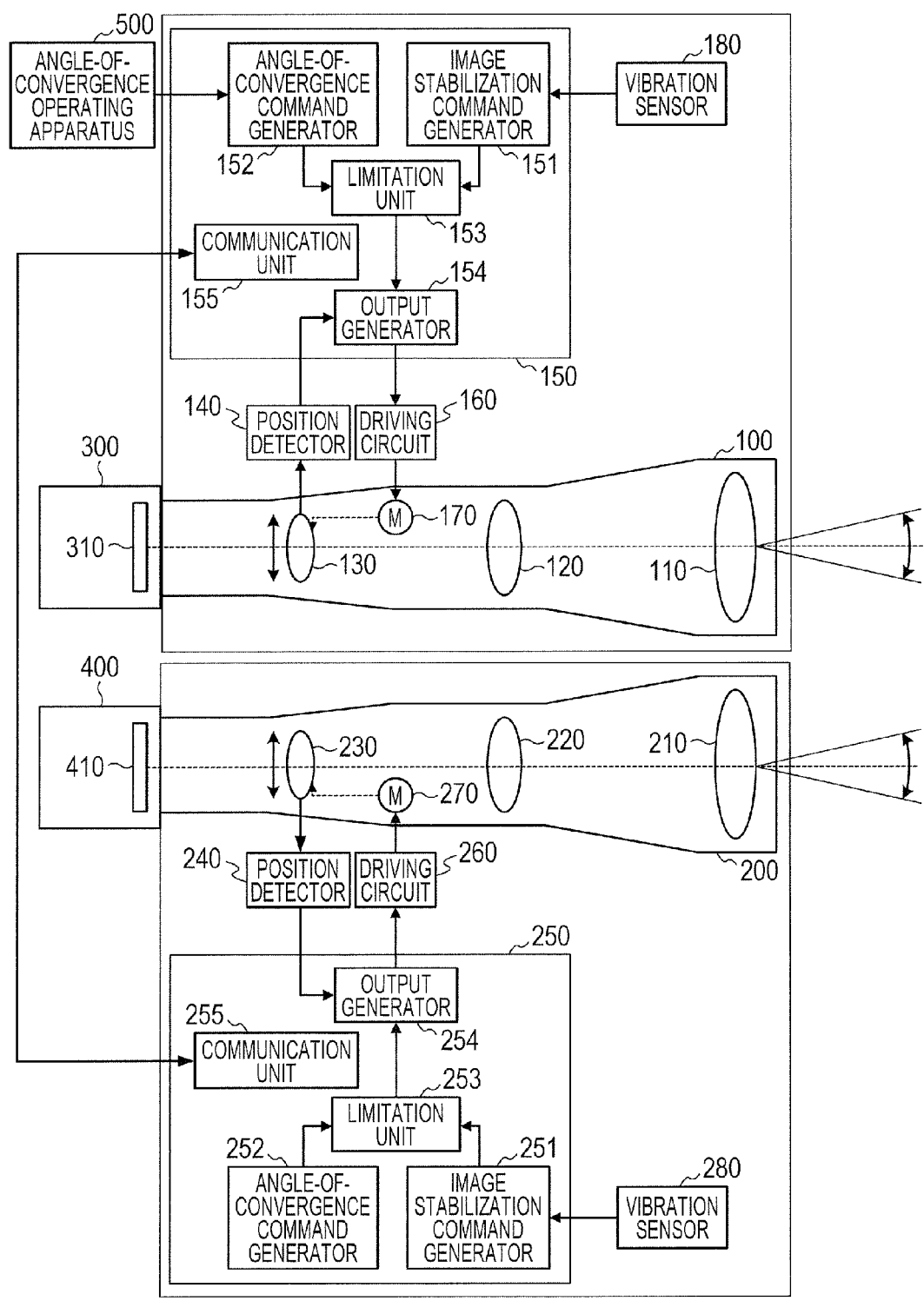
FIG. 1 is a block diagram illustrating a structure of a three-dimensional image pickup lens system according to a first embodiment of the present invention.

FIG. 1 is a block diagram illustrating a structure of an image pickup system including the three-dimensional image pickup lens system of the present invention.

The image pickup system of FIG. 1 is constructed by a lens apparatus 100 and a camera apparatus 300 for a left eye, a lens apparatus 200 and a camera apparatus 400 for a right eye, and an angle-of-convergence operating apparatus (setting unit) 500. The lens apparatus 100 has not only an image stabilization function but also a function of changing an optical axis (optical axis changing function) by the image stabilization mechanism.

The camera apparatus 300 of FIG. 1 takes a subject image formed on an image pickup element 310 through the lens apparatus 100 and converts the image into image data.

The lens apparatus 200 and the camera apparatus 400 have the same structures as the lens apparatus 100 and the camera apparatus 300, respectively, and hence descriptions thereof are omitted.

The angle-of-convergence operating apparatus 500 of FIG. 1 includes an operating portion that is connected to a communication unit (not shown) mounted in the lens apparatus 100 and is operated by a user, and outputs an angle-of-convergence signal based on an operation amount of the operating portion. The angle-of-convergence signal corresponds to a set value indicating, for example, an angle of convergence or a convergence length.

In the lens apparatus 100 of FIG. 1, a focus lens unit 110 is an optical element moving in the optical axis direction for changing an image forming position of the lens apparatus 100. The focus lens unit 110 is controlled and driven by a focus controller (not shown).

A zoom lens unit 120 of FIG. 1 is an optical element moving in the optical axis direction for changing a focal length of the lens apparatus 100. The zoom lens unit 120 is controlled and driven by a zoom controller (not shown).

A shift lens (optical element) 130 of FIG. 1 is an optical element that moves in a plane perpendicular to the optical axis (that moves with a component in the direction perpendicular to the optical axis) so as to bend the optical axis of the lens apparatus 100 by a predetermined angle. The shift lens 130 is moveable independently in the right and left direction (hereinafter referred to as an H-direction) and in the up and down direction (hereinafter referred to as a V-direction) in the plane perpendicular to the optical axis, and has control portions having the same specification for the each direction. In FIG. 1, only the H-direction is illustrated for a simplified description. In addition, optical axis control in the H-direction is referred to as convergence adjustment, and optical axis control in the V-direction is referred to as optical axis adjustment, in the following description. Hereinafter, concerning the optical axis control too, only the convergence adjustment in the H-direction is described. A shift lens position detector 140 detects a position of the shift lens 130 and outputs detected data to a CPU 150 through an AD converter (not shown). The CPU 150 generates a shift lens drive signal based on a command signal and a position signal described later and supplies the shift lens drive signal to a driving circuit 160 through a DA converter (not shown). The driving circuit 160 drives the shift lens 130 with a shift lens motor (driving unit) 170.

A vibration sensor 180 (detector) of FIG. 1 is a sensor that detects vibration of the lens apparatus 100 and outputs vibration data to the CPU 150 through an AD converter (not shown).

The CPU 150 performs control for image stabilization and convergence adjustment.

In the image stabilization control, an image stabilization command, generator (first generator) 151 calculates a position (corrected position) of the shift lens 130 for canceling image blur due to the vibration based on the vibration detected by the vibration sensor 180 and generates a command signal (first signal). The generated command signal is supplied to an output generator 154 through a limitation unit 153. The output generator 154 generates a drive signal for the shift lens 130 based on the command signal and a position signal of the shift lens 130 detected by the position detector 140, and outputs the drive signal to the driving circuit 160. In this way, the image blur is corrected. Details of the limitation unit 153 (limitation unit) are described later.

In the convergence adjustment control, an angle-of-convergence command generator (second signal generator) 152 calculates a position of the shift lens 130 for forming the angle of convergence (convergence position) using a conversion table based on the angle-of-convergence signal from the angle-of-convergence operating apparatus 500 and generates a command signal (second signal). The generated command signal is supplied to the output generator 154 through the limitation unit 153 and is supplied to the driving circuit 160 as the drive signal for the shift lens 130.

A communication unit 155 transmits information generated by the angle-of-convergence command generator 152 to a communication unit 255 in a CPU 250. In this way, the convergence adjustment control of the lens apparatus 100 and the lens apparatus 200 is performed, and the convergence length (angle of convergence) of the lens apparatus 100 and the lens apparatus 200 is controlled.

The limitation unit 153 restricts drive ranges of the command signals (the corrected position and the convergence position) supplied from the image stabilization command generator 151 and the angle-of-convergence command generator 152. In this embodiment, there is described an example where a high priority is given to the convergence adjustment, which is important in photography of a realistic three-dimensional image, and the image stabilization process is restricted when the panning operation is performed.

An effective maximum correction angle for limiting the corrected position set for the shift lens 130 and a shift lens 230 (effective maximum correction angle as a correctable maximum image stabilization amount) is described with reference to FIGS. 2A, 2B, 3A, and 3B.

Figure 2A:
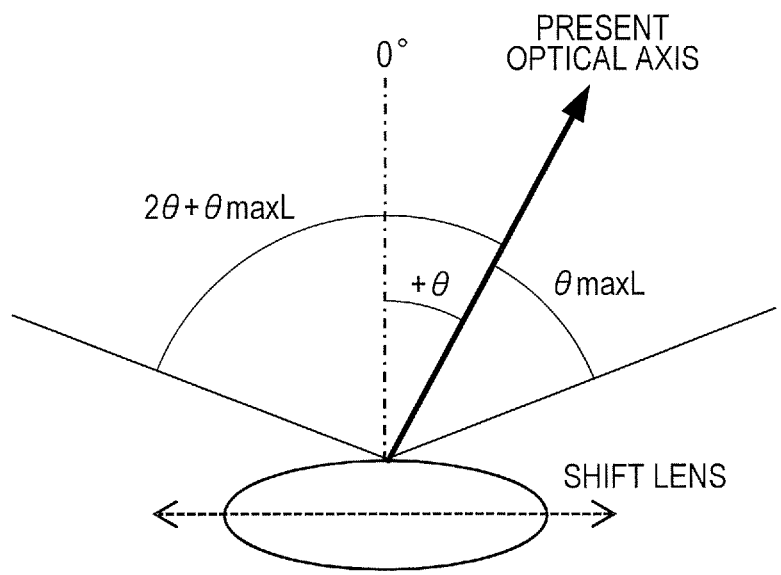
FIG. 2A is a diagram illustrating a maximum correction angle of a shift lens of the present invention.

FIG. 2A illustrates a case where the shift lens 130 of the lens apparatus 100 is moved from a reference position (at which the optical axis direction becomes zero degrees) to a position at which the optical axis direction becomes +θ degrees (a position to be a present optical axis) for convergence adjustment. In this case, the right maximum correction angle (maximum correction, amount) of the shift lens 130 becomes the right end in the drivable range of the shift lens 130, which is θmaxL. In addition, because a mechanical drivable range in the right direction and that in the left direction are the same with respect to the reference optical axis position, the left end in the drivable range of the shift lens 130 at the present optical axis position is 2θ+θmaxL.

Figure 2B:
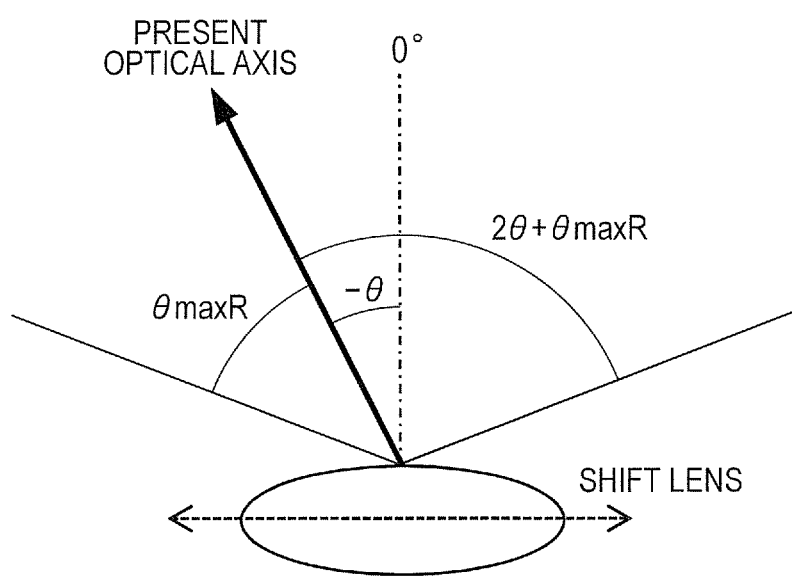
FIG. 2B is a diagram illustrating the maximum correction angle of the shift lens of the present invention.

Similarly, FIG. 2B illustrates a case where the shift lens 230 is moved so that the optical axis of the lens apparatus 200 moves from the reference optical axis position (at 0 degrees) to a position having an offset of −θ degrees (present optical axis) for convergence adjustment. In this case, the right maximum correction angle of the shift lens 230 becomes the right end in the drivable range of the shift lens 230, which is θmaxR. In addition, because a mechanical drivable range in the right direction and that in the left direction are the same with respect to the reference optical axis position, the left end in the drivable range of the shift lens 230 at the present optical axis position is 2θ+θmaxR.

Figure 3A:
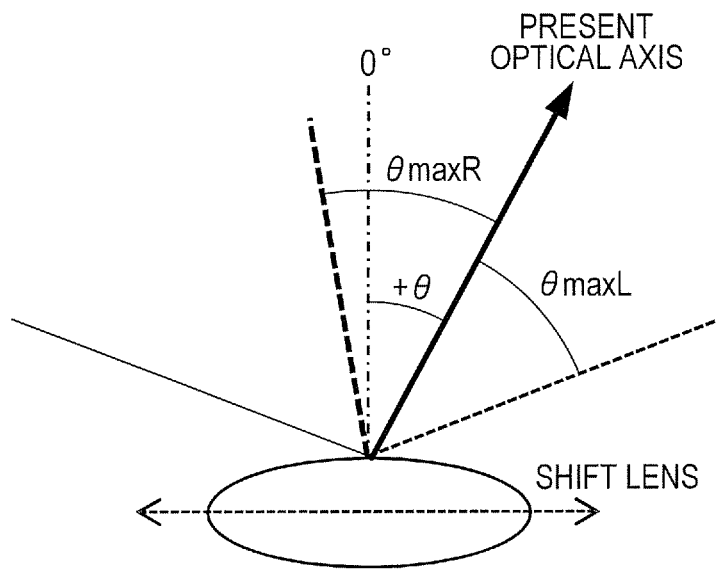
FIG. 3A is a diagram illustrating an effective maximum correction angle of the shift lens of the present invention.
Figure 3B:
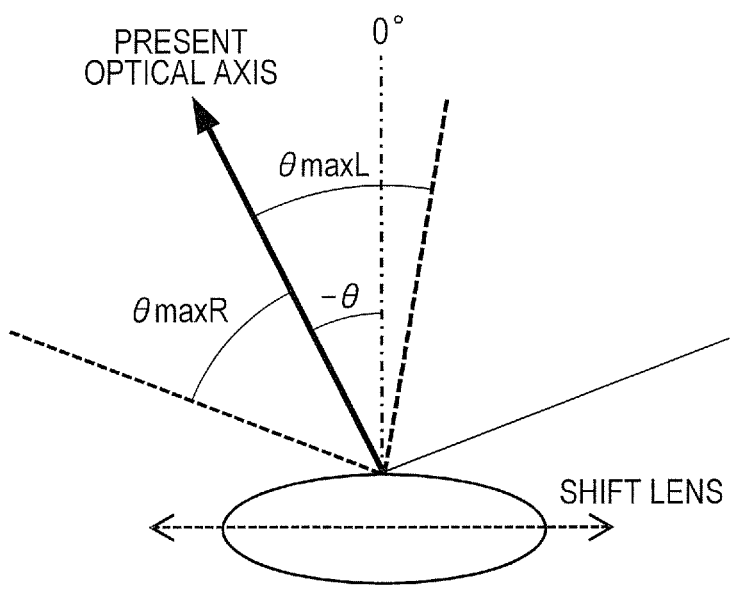
FIG. 3B is a diagram illustrating the effective maximum correction angle of the shift lens of the present invention.

Here, in a state where the photography is being performed with a predetermined angle of convergence, when the shift lenses 130 and 230 are moved based on the detected vibration so that a blur of the image formed on the image plane (image blur) is suppressed, the predetermined angle of convergence needs to be maintained regardless of the movement of the shift lens. For this purpose, the maximum correction angles of the shift lens 130 and the shift lens 230 in the same direction are set to be the same. In other words, the effective maximum correction angles of the shift lens 130 and the shift lens 230 in the same direction are set to be the maximum correction angle of the shift lens having a small maximum correction angle. In the example illustrated in FIGS. 2A and 2B, the maximum correction angle in the right side is θmaxL for the shift lens 130 and is 2θ+θmaxR for the shift lens 230. Therefore, θmaxL that is a smaller one of the maximum correction angles is set as the common effective maximum correction angle of the shift lens 130 and the shift lens 230 in the right direction (FIG. 3B). Similarly, the maximum correction angle in the left side is 2θ+θmaxL for the shift lens 130 and is θmaxR for the shift lens 230. Therefore, θmaxR that is a smaller one of the maximum correction angles is set as the common effective maximum correction angle of the shift lens 130 and the shift lens 230 in the left direction (FIG. 3A). In FIGS. 3A and 3E, the effective maximum correction angles for the shift lenses 130 and 230 are illustrated as ranges of dotted line.

Figure 4:
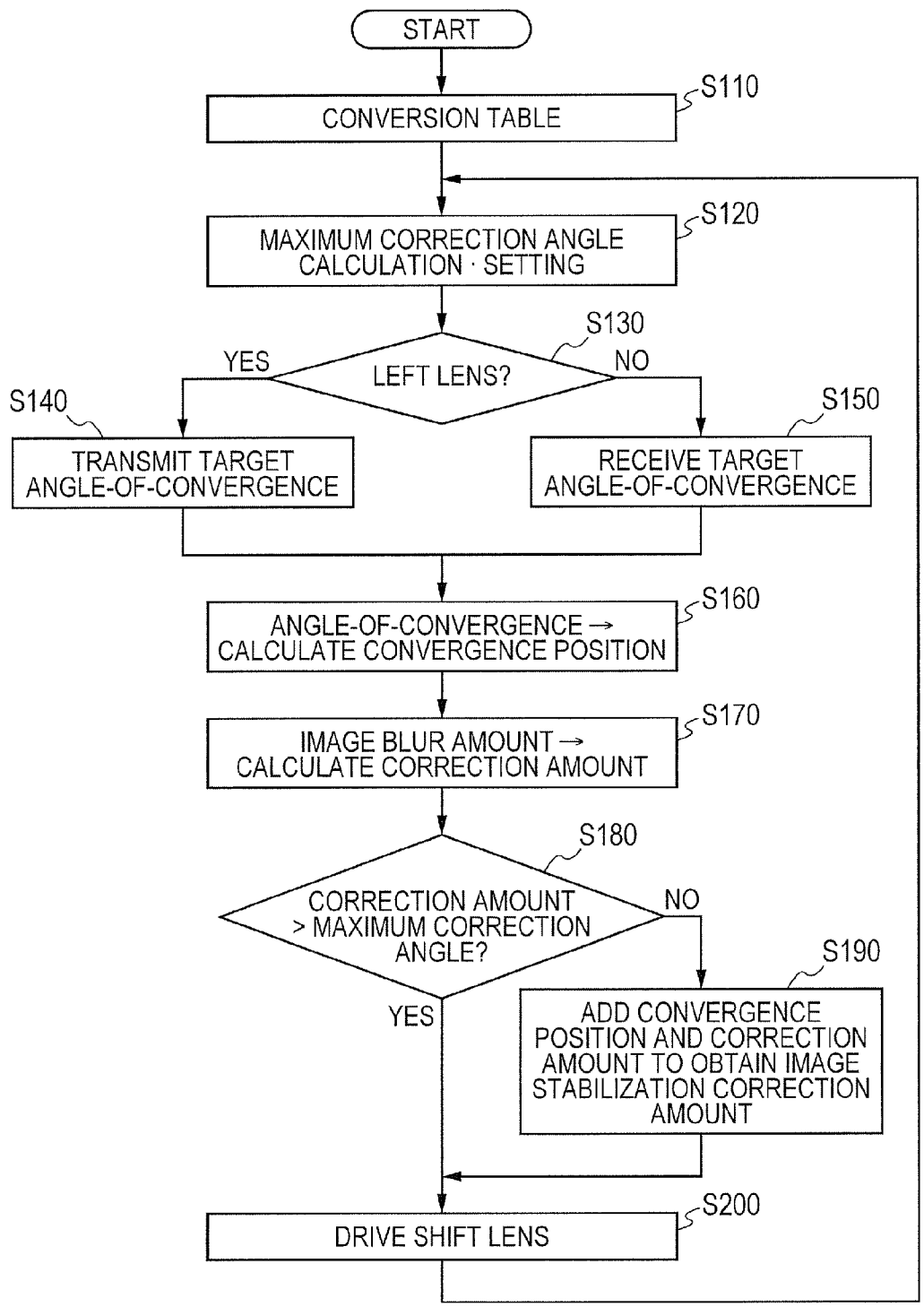
FIG. 4 is a flowchart illustrating a process flow of a CPU 150 according to the first embodiment of the present invention.

FIG. 4 is a flowchart illustrating a process of the CPU 150 of the lens apparatus 100 in this embodiment. In addition, the flowchart of FIG. 4 is also performed by the CPU 250 of the lens apparatus 200 in the same manner.

When the lens apparatus 100 is powered on, the process is performed from Step S110.

In Step S110, the communication unit 155 transmits a conversion table of the lens apparatus 100 to the communication unit 255 in the CPU 250. In addition, the communication unit 155 receives a conversion table of the lens apparatus 200 from the communication unit 255 in the CPU 250. By the process of Step S110, the lens apparatus 100 and the lens apparatus 200 share the conversion tables (indicating a relationship between the angle of convergence and the shift lens position for forming the angle of convergence) of the both lens apparatuses each other.

Next, in Step S120, the limitation unit 153 (calculation unit) calculates a maximum correction angle (maximum correction amount) of the shift lens 130, namely a maximum angle at which the image blur can be corrected, based on the conversion table transmitted and received in Step S110. Here, the limitation unit 153 also serves as a retaining unit further calculates the maximum correction angles based on the conversion tables of the shift lens 130 of the lens apparatus 100 and the shift lens 230 of the lens apparatus 200, respectively. A smaller maximum correction angle is set as the effective maximum correction angle (effective maximum correction amount). The limitation unit 153 performs image stabilization and convergence adjustment of the shift lens 130 within the calculated effective maximum correction angle range.

In Step S130, it is determined whether or not the lens apparatus is the one disposed on the left side among the two lens apparatuses. If the lens apparatus is the lens apparatus 100 disposed on the left side in FIG. 1, Step S130 is determined to be true, and the process proceeds to Step S140. On the contrary, if the lens apparatus is the lens apparatus 200 disposed on the right side in FIG. 1, Step S130 is determined to be false, and the process proceeds to Step S150. As to the method of determining whether the lens apparatus is disposed on the left side or on the right side, a determination may be made based on presence or absence of connection to the angle-of-convergence operating apparatus 500. Alternatively, the method may be written in a program or the like in advance. In addition, a switch (not shown) may be constituted for changing the lens apparatus externally.

In Step S140, the communication unit 155 extracts the angle-of-convergence signal for the convergence adjustment from the angle-of-convergence command generator 152 and transmits the signal to the communication unit 255 of the lens apparatus 200. Step S140 is performed as a process of the lens disposed on the left side, namely the lens apparatus 100, as in Step S130 described above. In contrast, Step S150 is performed as a process of the lens disposed on the right side, namely the lens apparatus 200, as in Step S130 described above. In Step S150, the communication unit 255 receives the angle-of-convergence signal for convergence adjustment from the communication unit 155 of the lens apparatus 100 and outputs the angle-of-convergence signal to an angle-of-convergence command generator 252. When Step S140 or Step S150 is performed, the process proceeds to Step S160.

In Step S160, the angle-of-convergence command generator 152 calculates the convergence position of the shift lens 130 from the angle-of-convergence signal based on the conversion table and generates the command signal. As described above, if the lens apparatus is disposed on the left side like the lens apparatus 100, the command signal is generated based on a value from the angle-of-convergence operating apparatus 500. In addition, if the lens apparatus is disposed on the right side like the lens apparatus 200, the command signal is generated based on the angle-of-convergence signal received from the lens apparatus 100.

Next, in Step S170, the image stabilization command generator 151 calculates an image blur amount from the vibration detected by the vibration sensor 180. Then, based on the image blur amount, the corrected position of the shift lens 130 for canceling the image blur due to the vibration is calculated.

In Step S180, the limitation unit 153 determines whether or not the corrected position of the shift lens 130 calculated in Step S170 is a valise larger than the effective maximum correction angle calculated in Step S120. For instance, if the command signal (convergence position) of the shift lens 130 calculated in Step S160 is close to the effective maximum correction, angle, the correction angle (correction amount) at which the image blur can be corrected becomes a small value. If the determination made in Step S180 is true, it is a case where a correction amount larger than the effective maximum correction angle is necessary, and the process proceeds to Step S200. This case is, for example, a case where the panning is being performed. If the determination made in Step S180 is false, it is determined that the corrected position is within the effective maximum correction angle, and the process proceeds to Step S190.

In Step S190, the limitation unit 153 adds the corrected position calculated in Step S170 for image stabilization to the convergence position of the shift lens 130 calculated in Step S160, thereby generating the command signal for driving the shift lens.

In Step S200, the command signal of the shift lens 130 calculated by the limitation unit 153 is output by the output generator 154 to drive the shift lens 130. When Step S200 is performed, the process returns to Step S120, and Steps S120 to S200 are repeatedly performed.

If the process proceeds to Step S200 after the determination made in Step S180 is true, a command signal based on the convergence position calculated in Step S160 is output as the command signal of the shift lens 130. In other words, during panning operation, the optical axes of the lens apparatus 100 and the lens apparatus 200 cars be returned to the position forming the angle of convergence set by the angle-of-convergence operating apparatus 500.

In this way, by setting the common effective maximum correction angle for convergence positions of the shift lens 130 and the shift lens 230, the image stabilization processes for the shift lens 130 and the shift lens 230 can be performed simultaneously. Therefore, in normal photography and during panning photography, the convergence length of the lens apparatus 100 and the lens apparatus 200 is not shifted incorrectly, and a good three-dimensional image can be obtained.

According to the three-dimensional image pickup lens system of this embodiment, it is possible to effectively achieve both the optical axis control for changing the angle of convergence to a desired angle and the panning control in the image stabilization.

In this embodiment, there has been described the case where the conversion tables of the shift lens 130 and the shift lens 230 are used to generate the convergence position and the command signal, but the command signal to be generated is not limited thereto. For instance, the command signal may be generated using a conversion table considering the optical axis correction amount based on the position of the zoom lens unit 120 if an optical axis shift occurs depending on the position of the zoom lens unit 120. In this case, it is possible to generate the commend signal based on the position of the zoom lens unit 120 and a target convergence position.

In addition, the case of using the shift lens as the optical element for changing the optical axis is described in this embodiment, but this is not a limitation. The optical element may be a mirror or a prism.

Second Embodiment

Figure 5:
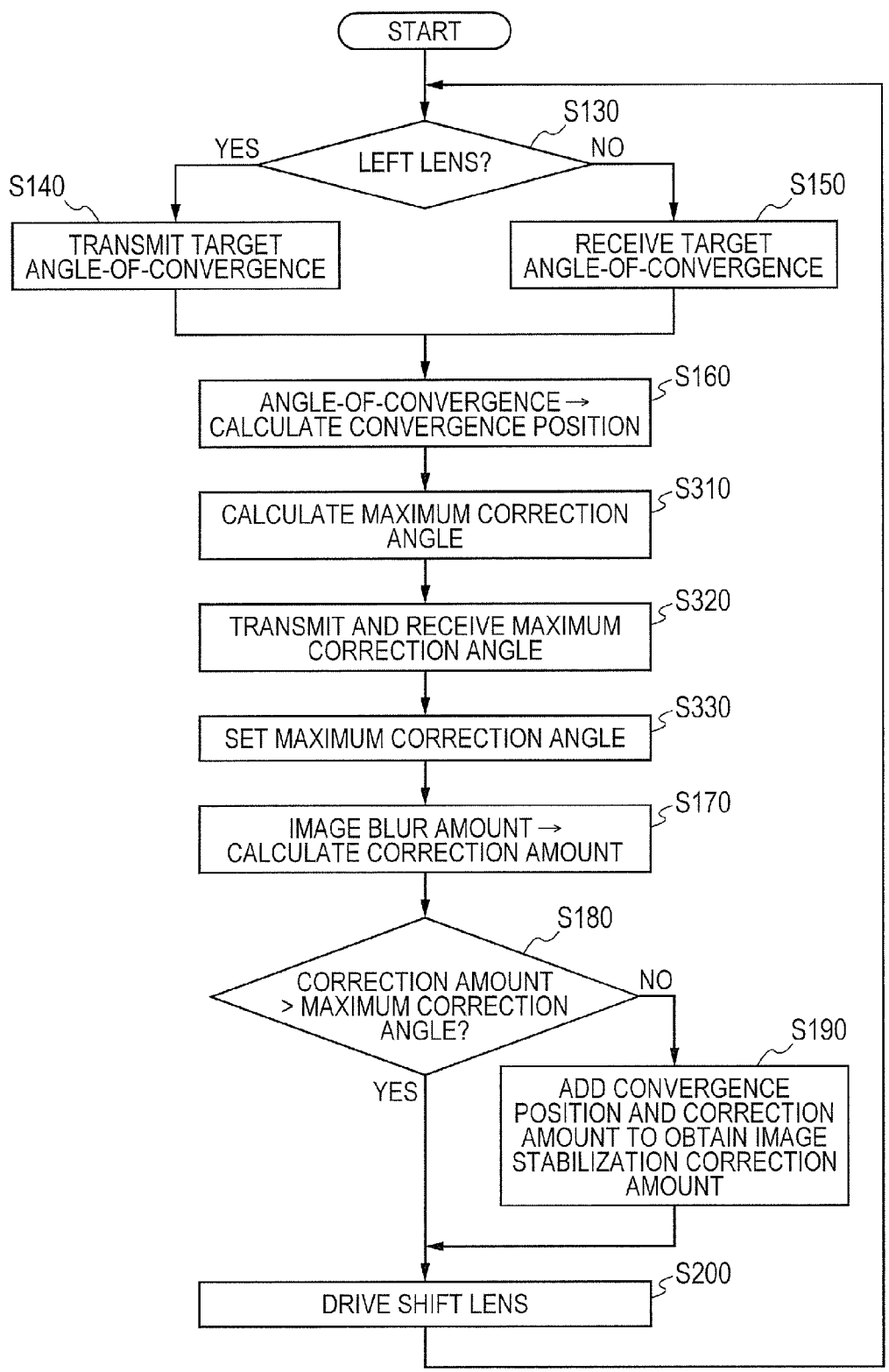
FIG. 5 is a flowchart illustrating a process flow of the CPU 150 according to a second embodiment of the present invention.

With reference to FIG. 5, a three-dimensional image pickup lens system according to a second embodiment of the present invention is described below.

In the first embodiment, when the power is turned on, the conversion tables of the shift lens 130 and the shift lens 230 of FIG. 1 are transmitted and received between the lens apparatus 100 and the lens apparatus 200 so as to share the conversion tables, and the effective maximum correction angle is calculated. In this embodiment, without sharing the conversion tables between the lens apparatus 100 and the lens apparatus 200, each of the lens apparatuses retains only its own conversion table. There is described a case where the maximum correction angle calculated in each of the lens apparatuses is transmitted to the other lens apparatus so that the effective maximum correction angle is retained in each lens apparatus, and hence setting of the angle of convergence and the image stabilization process are effectively performed.

The structure of the three-dimensional image pickup lens system, of this embodiment is the same as that of the first embodiment illustrated in FIG. 1, and therefore description thereof is omitted.

FIG. 5 is a flowchart illustrating a process of the CPU 150 of the lens apparatus 100 in this embodiment. Note that, the same step as that described above with reference to FIG. 4 is denoted by the same reference symbol, and description thereof is omitted. In addition, similarly to the first embodiment, processes by the CPU 150 in the lens apparatus 100 are mainly described in this embodiment, but the flowchart of FIG. 5 is also performed by the CPU 250 in the lens apparatus 200 in the same manner. When the lens apparatus 100 and the lens apparatus 200 are powered on, the process is performed from Step S130 of FIG. 5.

In this embodiment, the process is started from Step S130 and is performed until Step S160 as in the first embodiment, and then the process proceeds to Step S310. In Step S310, the maximum correction angle of the shift lens 130 is calculated based on the set convergence position. At this time point, the obtained maximum correction angle of the shift lens 130 (FIG. 2A) is 2θ+θmaxL on the left side and is θmaxL on the right side, while the obtained maximum correction angle of the shift lens 230 (FIG. 2B) is θmaxR on the left side and is 2θ+θmaxR on the right side. The process proceeds to Step S320.

In Step S320, the maximum correction angle of the shift lens 130 calculated in Step S310 is transmitted to the other lens apparatus 200 through the communication units 155 and 255. Similarly, in the lens apparatus 200, the calculated maximum correction angle of the shift lens 230 is transmitted to the other lens apparatus 100 through the communication units 155 and 255. By this process, the lens apparatus 100 and 200 can share the maximum correction angles of the shift lens 130 and the shift lens 230 each other at the angle of convergence at the time point.

In Step S330, based on the shared maximum correction angle, a smaller one of the shared maximum correction angles is set and retained as the effective maximum correction angle for each of the right and left lens apparatuses. Then, the process proceeds to Step S170, and the same process as in the first embodiment is performed from Step S170 to Step S200. If the movement amount of the shift lens (change amount in the optical axis direction) necessary for correcting the image blur amount due to the vibration detected by the vibration sensor is larger than the effective maximum correction angle, only the command signal for convergence adjustment is output to the shift lens 130.

In this embodiment, the effective maximum correction angle for limiting the image stabilization is determined as follows. A target angle-of-convergence is periodically transmitted and received between the lens apparatus 100 and the lens apparatus 200, and the maximum correction angle is periodically calculated. Then, the obtained maximum correction angle for each shift lens is periodically transmitted and received between the lens apparatus 100 and the lens apparatus 200. Therefore, as described in the first embodiment, the effective maximum correction angle can be determined without sharing information about the conversion table between the lens apparatuses. Therefore, the process for calculating the maximum correction angle based on the conversion table can be eliminated from the other lens apparatus so that the process load can be reduced.

Also in the three-dimensional image pickup lens system of this embodiment, it is possible to effectively achieve both the optical axis control for changing the angle of convergence to a desired angle and the panning control in the image stabilization.

Third Embodiment

Figure 6:
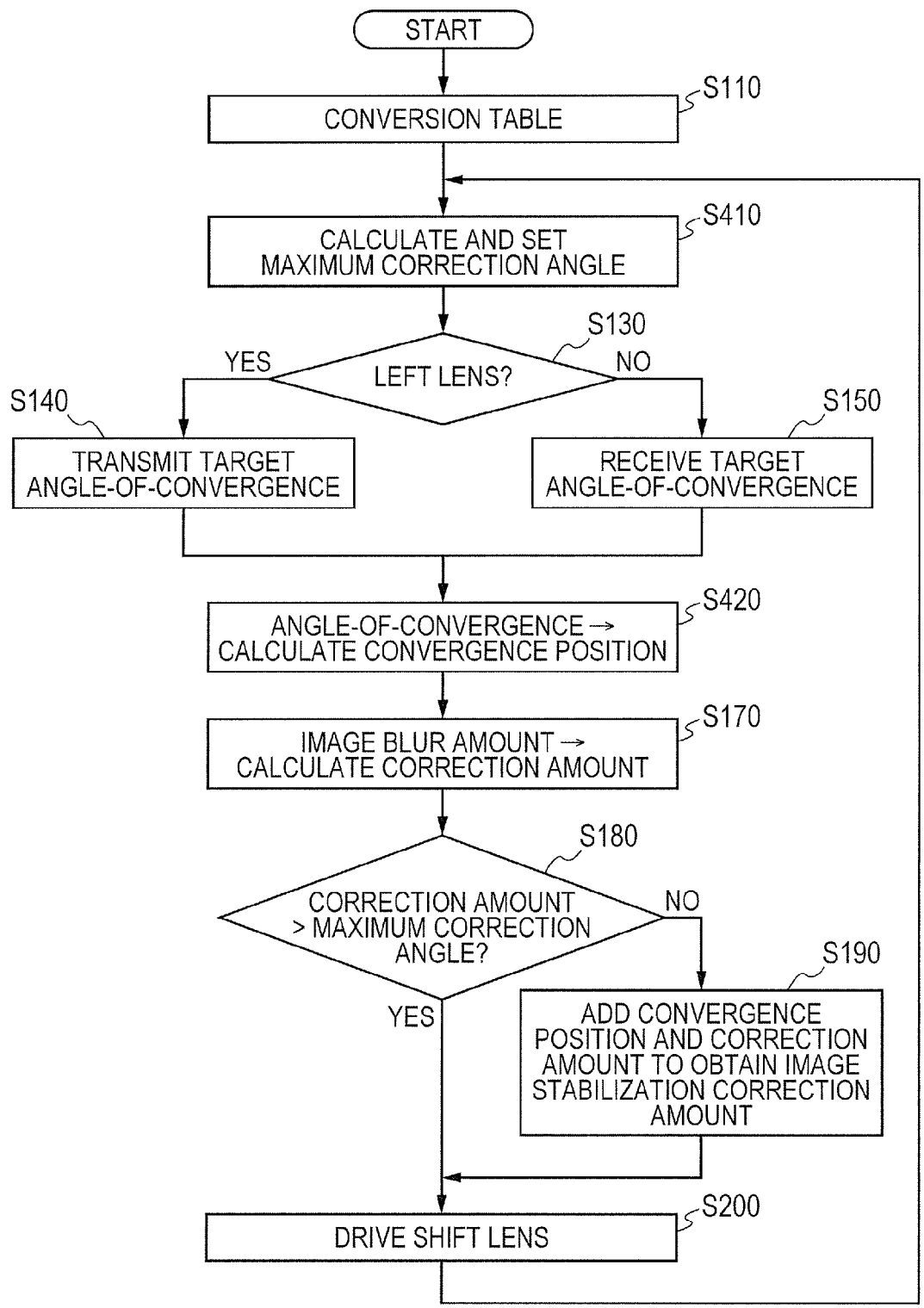
FIG. 6 is a flowchart illustrating a process flow of the CPU 150 according to a third embodiment of the present invention.

With reference to FIG. 6, a three-dimensional image pickup lens system according to a third embodiment of the present invention is described below.

In the first and second embodiments, there are described examples in which the lens apparatus 100 and the lens apparatus 200 are horizontally disposed. As an operational form of the three-dimensional imaging, there is a case where one of the lenses is disposed to be rotated by 90 degrees with respect to the optical axis. In this case, the lens apparatus 100 and the lens apparatus 200 have different directions in the panning determination. In this embodiment, there is described a method of applying the present invention for the case where one of the lenses is disposed to fee rotated by 90 degrees with respect to the optical axis.

The structure of the three-dimensional image pickup lens system of this embodiment is the same as that in the first embodiment illustrated in FIG. 1, and therefore description thereof is omitted. In this embodiment, there is described an example in which the lens apparatus 100 is disposed to be rotated by 90 degrees.

FIG. 6 is a flowchart illustrating a process of the CPU 150 of the lens apparatus 100 in this embodiment. In addition, the flowchart of FIG. 6 is also performed by the CPU 250 in the lens apparatus 200 in the same manner.

The same step as that described above with reference to FIG. 4 is denoted by the same reference symbol, and description thereof is omitted.

In Step S110, similarly to the process described in the first embodiment with reference to FIG. 4, communication for sharing the conversion table between the lens apparatuses is performed, and the process proceeds to Step S410.

Step S410 corresponds to Step S120 in the first embodiment, and in this step, the effective maximum correction angle (effective maximum correction amount) is calculated. In this embodiment, because the lens apparatus 100 is disposed to be rotated by 90 degrees with respect to the optical axis with respect to the lens apparatus 200, the moving direction of the shift lens for changing the angle of convergence is the Y-direction of the shift lens 130 and the H-direction of the shift lens 230. Therefore, considering the convergence position, the V-direction of the shift lens 130 and the H-direction of the shift lens 230 are associated with each other. Then, a smaller one of the maximum correction angles of the shift lens 130 and the shift lens 230 is set as the effective maximum correction angle. In other words, in accordance with an angle corresponding to the rotation amount of arrangement between the lens apparatuses, coordinates are converted, and the maximum correction angles are calculated and compared between the tens apparatuses so as to set the effective maximum correction angle.

In Steps S130 to S150, the same process as in FIG. 4 is performed.

In Step S420, the angle-of-convergence command generator 152 calculates the convergence position of the shift lens 130 from the angle of convergence and generates the command signal. In this embodiment, because the lens apparatus 100 is disposed to be rotated by 90 degrees, the command signal generated by the angle-of-convergence command generator 152 is generated as a V-direction command signal of the shift lens 130. In addition, if the lens apparatus is disposed without being rotated like the lens apparatus 200 similarly to the first embodiment, an H-direction command signal of the shift lens 230 is generated by the angle-of-convergence command generator 252 based on the angle-of-convergence signal received from the lens apparatus 100.

Next, in Step S170, similarly to the first embodiment, the corrected position of the shift lens 130 is calculated. However, differently from the first embodiment, the same vibration applied to the lens apparatus 100 and the lens apparatus 200 is detected as different vibration directions by 90 degrees between the lens apparatus 100 and the lens apparatus 200. Therefore, the vibration which is detected as the V-direction vibration by the lens apparatus 100 is detected as the H-direction vibration by the lens apparatus 200. In addition, in the lens apparatus 100 and 200, the vibrations are independently detected by the vibration sensors 180 and 280, respectively. Then, the control of moving each shift lens is performed so as to correct the image blur due to the vibration detected in each lens apparatus. In other words, as to a drive direction of the shift lens for correcting the image blur due to the same vibration, for example, the command signal is generated as a correction, angle in the V(H) direction of the shift lens 130 and in the H(−V) direction of the shift lens 230.

In Steps S180 to S200, the shift lens 130 is driven similarly to the first embodiment. However, because the lens apparatus 100 is disposed to be rotated by 90 degrees, the second embodiment is different from the first embodiment in that the objects to be compared in Step S180 are the correction amount of the shift lens 130 in the V-direction and the effective maximum correction angle in the V-direction as for the lens apparatus 100.

In this way, if the lens apparatus 100 is disposed to be rotated by 90 degrees, the process is necessary to be performed by rotating the panning detection direction by 90 degrees. On the other hand, as the correction process for image stabilization, the image stabilization process is performed in the disposed state of being rotated by 90 degrees. As described above, even if one of the lens apparatuses is disposed to be rotated by 90 degrees, the panning determination and process can be effectively performed.

Also in the three-dimensional image pickup lens system of this embodiment, it is possible to effectively achieve both the optical axis control for changing the angle of convergence to a desired angle and the panning control in the image stabilization.

Although the exemplary embodiments of the present invention are described above, the present invention is not limited to these embodiments and can be variously modified and changed within the range of the spirit thereof.

For instance, in the first to third embodiments, only the drive of the shift lens 130 in the H-direction (the convergence adjustment and the image stabilization in the H-direction) is described, but this is not a limitation. The same is true for the drive of the shift lens 130 in the V-direction (the optical axis adjustment and the image stabilization in the V-direction). In addition, the H-direction panning (rotation having a component in the direction in which the two lens apparatuses are disposed) is described above, but the present invention can also be applied similarly to tilting (rotation having a component in the direction perpendicular to the plane including optical axes of the two lens apparatuses) by calculating the maximum correction angle concerning the V-direction. Further, the angle-of-convergence adjustment may be performed only for the control of the H-direction component or the image stabilization may be performed only for the control of the V-direction component. In addition, the example where one of the lenses is disposed to foe rotated by 90 degrees is described in the third embodiment, but the present invention can be applied also to a case where both the lenses are disposed to be rotated, by using this embodiment.

In addition, in the embodiments described above, the shift lens is driven only by the command signal for the angle-of-convergence control without considering the command signal for image stabilization when the movement amount of the shift lens necessary for image stabilization is larger than the maximum correction angle, but the present invention is not limited thereto. For instance, the effect of the present invention can be obtained also by controlling a gain dynamically so that the shift lens is driven within the maximum correction angle or by providing a software limit at the maximum correction angle position so that the shift lens is not driven beyond the maximum correction angle.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-258578, filed Nov. 27, 2012, which is hereby incorporated by reference herein in its entirety.

What is claimed is:

1. A three-dimensional image pickup lens system comprising:
two lens apparatuses each comprising:
an optical element to be driven in a direction containing a component in a direction perpendicular to an optical axis;
a driving unit driving the optical element;
a detector detecting vibration of a corresponding one of the two lens apparatuses;
a first generator generating a first signal driving the optical element to correct image blur due to the vibration;
a second generator generating a second signal driving the optical element to a position corresponding to a set angle of convergence; and
a controller controlling the driving unit to drive the optical element based on:
an effective maximum correction amount as a correctable maximum image stabilization amount that is determined based on the second signals generated in the two lens apparatuses and is common to the two lens apparatuses;
the first signal; and
the second signal,
wherein the controller controls the driving unit based on:
the second signal when the first signal is larger than the effective maximum correction amount; and
the second signal and the first signal when the first signal is not larger than the effective maximum correction amount.

2. A three-dimensional image pickup lens system according to claim 1, further comprising:
a calculation unit calculating a maximum correction amount as the correctable maximum image stabilization amount in each of the two lens apparatuses based on the second signal,
wherein the effective maximum correction amount is determined based on the maximum correction amounts of the two lens apparatuses.

3. A three-dimensional image pickup lens system according to claim 2, wherein the effective maximum correction amount concerning one direction is set to be a smaller one of the maximum correction amounts in the one direction calculated by the calculation units of the two lens apparatuses.

4. A three-dimensional image pickup lens system according to claim 1, wherein the detector detects a vibration containing a component in a direction in which the two lens apparatuses are arranged.

5. A three-dimensional image pickup lens system according to claim 1, wherein the detector detects a vibration containing a component in a direction perpendicular to a plane including optical axes of the two lens apparatuses.

6. A three-dimensional image pickup lens system according to claim 2, wherein the calculation unit calculates the maximum correction amount based on the second signal generated by the second generator.

7. A three-dimensional image pickup lens system according to claim 2, further comprising:
a zoom unit changing a focal length,
wherein the maximum correction amount is determined based on the focal length and the second signal.

8. A three-dimensional image pickup lens system according to claim 2, wherein:
at least one of the two lens apparatuses is disposed to be rotated by a predetermined angle with respect to the optical axis, and
the calculation unit performs coordinate conversion by the angle and sets the maximum correction amount in the corresponding direction.

9. A three-dimensional image pickup lens system according to claim 1, further comprising:
a setting unit setting an angle of convergence as a set value,
wherein the second generator generates the second signal for driving the optical element to an optical axis position forming the angle of convergence set by the setting unit.

10. A three-dimensional image pickup lens system according to claim 1, further comprising:
a setting unit setting a convergence length as a set value,
wherein the second generator generates the second signal for driving the optical element to an optical axis position forming the convergence length set by the setting unit.

11. A three-dimensional image pickup lens system according to claim 9, wherein:
the setting unit is connected to one of the two lens apparatuses,
the two lens apparatuses each include a communication unit to communicate with each other through the communication units, in the other of the two lens apparatuses to which the setting unit is not connected, the second generator generates the second signal based on the set value supplied through the communication units from the one of the two lens apparatuses to which the setting unit is connected, and the maximum correction amount calculated by the calculation unit based on the second signal is shared by the two lens apparatuses through the communication units.

12. A three-dimensional image pickup lens system according to claim 10, wherein:

the setting unit is connected to one of the two lens apparatuses, the two lens apparatuses each include a communication unit to communicate with each other through the communication units, in the other of the two lens apparatuses to which the setting unit is not connected, the second generator generates the second signal based on the set value supplied through the communication units from the one of the two lens apparatuses to which the setting unit is connected, and the maximum correction amount calculated by the calculation unit based on the second signal is shared by the two lens apparatuses through the communication units.

13. An image pickup system comprising:

a three-dimensional image pickup lens system comprising two lens apparatuses, each of the two lens apparatuses comprising:

an optical element to be driven in a direction containing a component in a direction perpendicular to an optical axis;

a driving unit driving the optical element;

a detector detecting vibration of a corresponding one of the two lens apparatuses;

a first generator generating a first signal driving the optical element so as to correct image blur due to the vibration;

a second generator generating a second signal driving the optical element to a position corresponding to a set angle of convergence; and a controller controlling the driving unit to drive the optical element based on:

an effective maximum correction amount as a correctable maximum image stabilization amount that is determined based on the second signals generated in the two lens apparatuses and is common to the two lens apparatuses;

the first signal; and the second signal, wherein the controller controls the driving unit based on:

the second signal when the first signal is larger than the effective maximum correction amount; and the second signal and the first signal when the first signal is not larger than the effective maximum correction amount; and a camera apparatus for taking subject images formed by the three-dimensional image pickup lens system.

* * * * *